(12) United States Patent
Rabinovich et al.

(10) Patent No.: US 9,043,746 B2
(45) Date of Patent: May 26, 2015

(54) CONDUCTING VERIFICATION IN EVENT PROCESSING APPLICATIONS USING FORMAL METHODS

(75) Inventors: Ella Rabinovich, Haifa (IL); Sivan Rabinovich, Haifa (IL); Sitvanit Ruah, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 1115 days.

(21) Appl. No.: 13/041,462

(22) Filed: Mar. 7, 2011

(65) Prior Publication Data
US 2012/0233587 A1 Sep. 13, 2012

(51) Int. Cl.
*G06F 9/44* (2006.01)
(52) U.S. Cl.
CPC .. *G06F 8/10* (2013.01); *G06F 8/35* (2013.01); *G06F 9/444* (2013.01)
(58) Field of Classification Search
CPC ............... G06F 8/34; G06F 8/38; G06F 8/10; G06F 8/20
USPC ......................................................... 717/105
See application file for complete search history.

(56) References Cited

U.S. PATENT DOCUMENTS

| 7,263,694 | B2 * | 8/2007 | Clewis et al. ................. | 717/156 |
|---|---|---|---|---|
| 2002/0046393 | A1 * | 4/2002 | Leino et al. ........................ | 717/7 |
| 2003/0110474 | A1 * | 6/2003 | Ur et al. ........................ | 717/131 |
| 2006/0282806 | A1 * | 12/2006 | Cadambi et al. .................. | 716/5 |
| 2006/0282807 | A1 * | 12/2006 | Ivancic et al. ..................... | 716/5 |
| 2008/0082968 | A1 | 4/2008 | Chang et al. | |
| 2009/0070746 | A1 * | 3/2009 | Dhurjati et al. ................ | 717/128 |
| 2010/0088678 | A1 | 4/2010 | Alturki et al. | |
| 2010/0293557 | A1 | 11/2010 | Tkachuk et al. | |
| 2012/0192169 | A1 * | 7/2012 | Li et al. ........................ | 717/161 |

FOREIGN PATENT DOCUMENTS

EP 1014265 6/2000

OTHER PUBLICATIONS

Jameleddine Hassin, "Formal Semantics and Verification of Use Case Maps", PhD thesis, Apr. 2008, Concordia University Montreal, Quebec, Canada.
Ella Rabinovich et al., "Analyzing the Behavior of Event Processing Applications", DEBS'10, Jul. 12-15, 2010, Cambridge, UK.

* cited by examiner

*Primary Examiner* — Li B Zhen
*Assistant Examiner* — Arshia S Kia

(57) ABSTRACT

A method of applying formal verification methodologies to event processing applications is provided herein. The method includes the following stages: representing an event processing application as an event processing network, being a graph with event processing agents as nodes; generating a finite state machine based on the event processing network, wherein the finite state machine is an over-approximation of the event processing application; expressing stateful rules and policies that are associated with the event processing application using temporal logic, to yield a temporal representation of the event processing application; combining the temporal representation and the finite state machine into a model; generating a statement associated with a user-selected verification-related property of the event processing application, wherein the statement is generated using the temporal representation; and applying the statement to the model, to yield an indication for: (i) a correctness of the statement or (ii) a counter example, respectively.

22 Claims, 3 Drawing Sheets

CONDUCTING VERIFICATION IN EVENT PROCESSING APPLICATIONS USING FORMAL METHODS

BACKGROUND

1. Technical Field

The present invention relates to formal verification and more particularly, to applying formal verification methodologies to event processing applications.

2. Discussion of the Related Art

Current verification methods used in conjunction with event processing applications lack that ability to provide a comprehensive evaluation of the correctness and the logical integrity of the event processing applications.

In formal verification, model checking is a technique that provides an automatic exhaustive exploration of an entire application model. This exhaustive search allows mathematical reasoning of system properties that would be beneficial for verifying event processing applications.

However, no attempts are known to address a generalized model of an event processing application, including properties such as policies and statefulness, in order to successfully apply formal verification methodologies to event processing applications.

BRIEF SUMMARY

One aspect of the present invention provides a method of applying formal verification methodologies to an event processing application. The method includes the following stages: representing an event processing application as an event processing network, being a graph with event processing agents as nodes; generating a finite state machine based on the event processing network, wherein the finite state machine is an over-approximation of the event processing application; expressing stateful rules and policies that are associated with the event processing application using temporal logic, to yield a temporal representation of the event processing application; combining the temporal representation and the finite state machine into a model; generating a statement associated with a user-selected verification-related property of the event processing application, wherein the statement is generated using the temporal representation; and applying the statement to the model, to yield an indication for: (i) a correctness of the statement or (ii) a counter example, respectively.

Other aspects of the invention may include system arranged to execute the aforementioned method and a computer readable program configured to execute the stages of the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
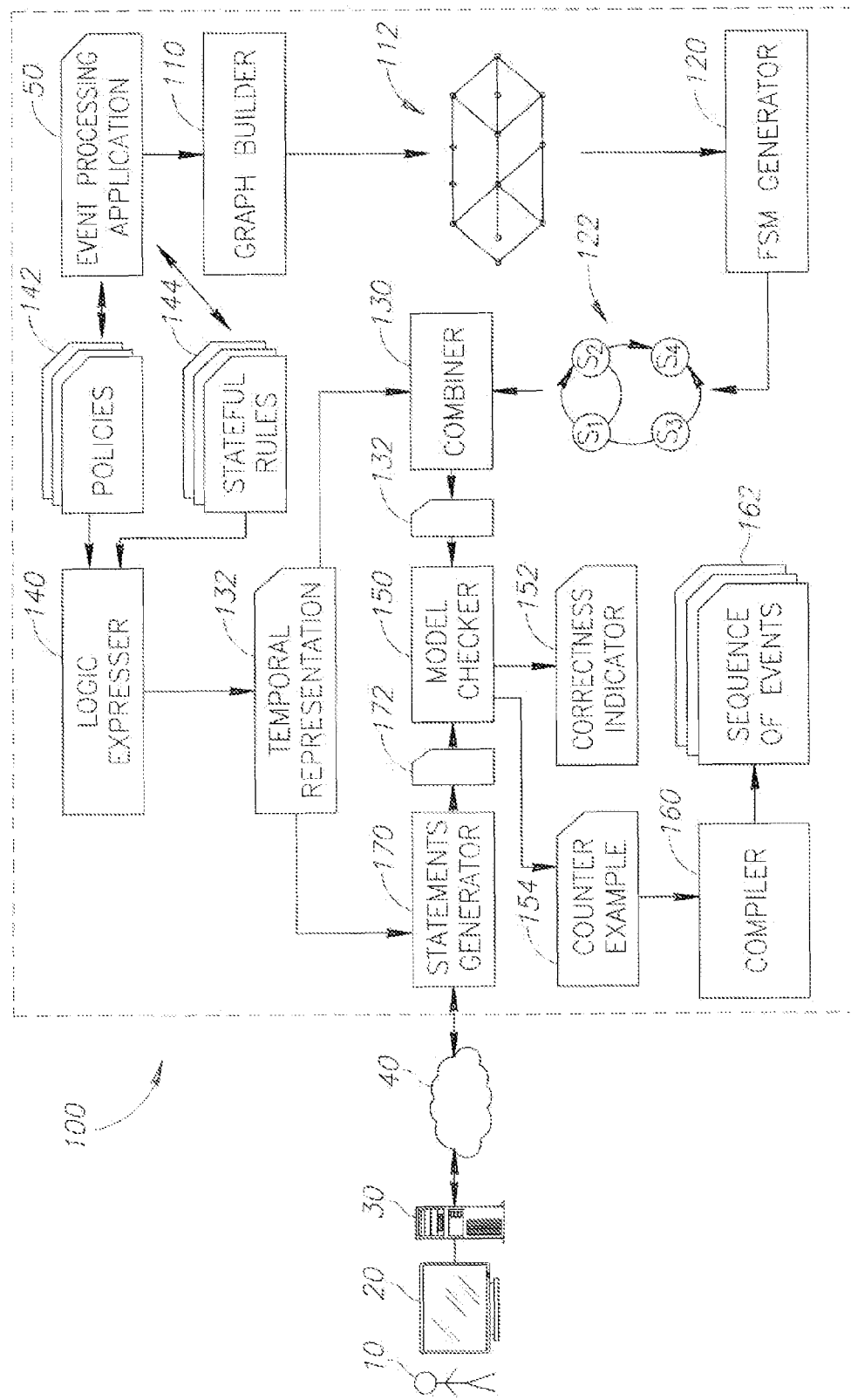
FIG. 1 is a high level schematic block diagram illustrating a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The terms "event processing system" or "event processing application" as used herein in this application refer to a computerized system or a computer application respectively, configured to: process multiple events happening across all the layers of an organization, derive events as a function of the processed events to detect significant situations within the event cloud, analyze their impact, and take subsequent action in real time. An event may be observed as a change of state with any physical or logical or otherwise discriminated condition.

The term "event processing agent" as used herein in this application refers to a processing element that applies some logic on set of input events, to generate a set of output (derived) events.

The term "event processing network" as used herein in this application refers to a conceptual model, describing the event processing flow execution. It includes a collection of event processing agents, producers, and consumers linked by channels. An event processing network may be represented by a graph such that event processing agents serve as nodes on the graph.

The terms "pattern policies" or simply "policies" as used herein in the context of event processing refer to rules according to which disambiguation of pattern matching semantics is carried out. Policies determine, for example, how to evaluate an event, what happens if there is a contradiction between two or more pattern matching, what is the result of a specific pattern matching, and the like. In other word, policies may be regarded as a higher order of decision making associated with pattern matching.

The terms "statefulness" or "stateful rules" as used herein in the context of event processing refer to the property of an event processing agent which maintains its internal state over successive invocations. For example, an event processing agent that carries out an aggregation of events over time window is considered stateful, whereas an event processing agent that filters out events by applying a predicate on a single event attributes is considered stateless.

The term "formal verification" as used herein in this application refers to a process of proving or disproving the correctness of intended algorithms underlying a system with respect to a certain formal specification or property, using formal methods of mathematics. One approach of formal verification is model checking, which provides a systematically exhaustive exploration of the mathematical model of the design, wherein the model may be in a form of a finite state machine.

The term "counter example" as used herein in the context of formal verification in this application refers to an at least one scenario that contradicts the correctness of a statement applied to a model of a system or an application, during formal model checking.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating a system according to some embodiments of the invention. System 100 may be implemented as a verification tool in communication via a network 40 with at least one personal computer 30 associated with a user interface 20 and a user 10. In other words, system 100 enables user 10 to apply formal verification techniques to a specific event processing application 50. System 100 enables a user to generate scenarios that test the event processing application while adhering to formal verification methodologies.

System 100 may include a graph builder 110 configured to represent event processing application 50 as an event processing network (EPN) 112. Event processing network 112 is basically a graph with event processing agents as nodes. System 100 may include a finite state machine (FSM) generator which is configured to generate a finite state machine, based on data derived from event processing network 50. Specifically, the generated finite state machine is an over-approximation of event processing application 50 expressing several degrees of freedom for its behavior over time.

System 100 may further include a logic expresser 140 configured to, possibly responsive to input from user 10, express stateful rules 144 and policies 142 that are associated with event processing application 50 using temporal logic, to yield a temporal representation 132 of event processing application 50.

System 100 may further include a combiner 130 configured to enhance finite state machine 122 with temporal representation 132 so as to yield a model of event processing application 50 that encompasses the sequential behavior of event processing application 50, as well as its policies and stateful rules.

System 100 may further include a statement generator 170 configured to generate, possibly responsive to input provided by user 10 over user interface 20, a statement associated with one or more user-selected verification-related properties of event processing application 50. Specifically, statement 172 is generated using temporal representation 132.

System 100 may further include a model checker 150 configured to apply statement 172 to model 132, to yield, in accordance with formal verification practice, either a correctness indicator 152 for the correctness of statement 172 or a counter example 154 that contradicts statement 172. In other words, counter example 154 may be compilable into a sequence of events, that when applied to event processing application 50, triggers the event processing agents that are associated with the verification-related property selected by the user.

System 100 may further include a compiler 160 configured to receive counter example 154 and produce a corresponding sequence of events 162 that may serve as a scenario that may serve as a test for the corresponding verification-related property of event processing application 50.

Consistent with some embodiments of the present invention, any of the user-selected verification-related property is expressible as a property represented by the event processing network and comprises various properties such as: reachability of at least one of the event processing agents, equivalence of two or more of the event processing agents, mutual exclusivity of two or more of the event processing agents, coverage of at least some of the event processing agents, coverage of all of the event processing network, and the like.

Consistent with some embodiments of the present invention, the finite state machine representation is carried out using any type of a hardware description language or more generally, languages that are capable of describing transition systems. Non-limiting examples for such languages may include: VHDL, Verilog, SystemC, and the like. Similarly, the logic expressing via logic expresser 140 may be carried out using any type of language that is capable of expressing a sequential behavior of finite state machine 122. Non-limiting examples for such languages may include: Property Specification Language (PSL), SystemVerilog Assertions (SVA), and the like.

Consistent with some embodiments of the present invention, a non-limiting example of the verification-related property of the event processing application may be the reachability of a specified event processing agent within the event processing network. In such a case the statement is generated such that it indicates that the specified event processing agent is unreachable over the graph. For such a case, the respective counter example may be compilable into a sequence of events that traces a path over the event processing network to the specified event processing agent.

Consistent with some embodiments of the present invention, a non-limiting example is a case in which the verification-related property of the event processing application is the equivalence of two or more of the event processing agents within the event processing network. In such a case, the statement is generated such that it indicates that the two or more of the event processing agents produce a same output for a same input at a same period of time. For such a case, the respective counter example is compilable into a sequence of events that contradicts the statement.

Consistent with some embodiments of the present invention, a non-limiting example of the verification-related property of the event processing application may be the mutual exclusivity of two of the event processing agents within the graph. In such a case, the statement is generated such that it indicates that the two or more of the event processing agents are mutual exclusive such that for any given input, one of the two event processing agents produces a different output from another one of the two event processing agents, at a same point of time. For such a case, the respective counter example is compilable into a sequence of events that contradicts the statement.

Consistent with some embodiments of the present invention, a non-limiting example of the verification-related property of the event processing application may be the coverage of one or more paths of event processing agents over the event processing network (or the whole network). In such a case, the statement is generated such that it indicates that at least one of the event processing agents on the one or more paths is not reachable. For such a case, the respective counter example may be compilable into at least one sequence of events that covers the event processing agents that are on the one or more paths.

Figure 2:
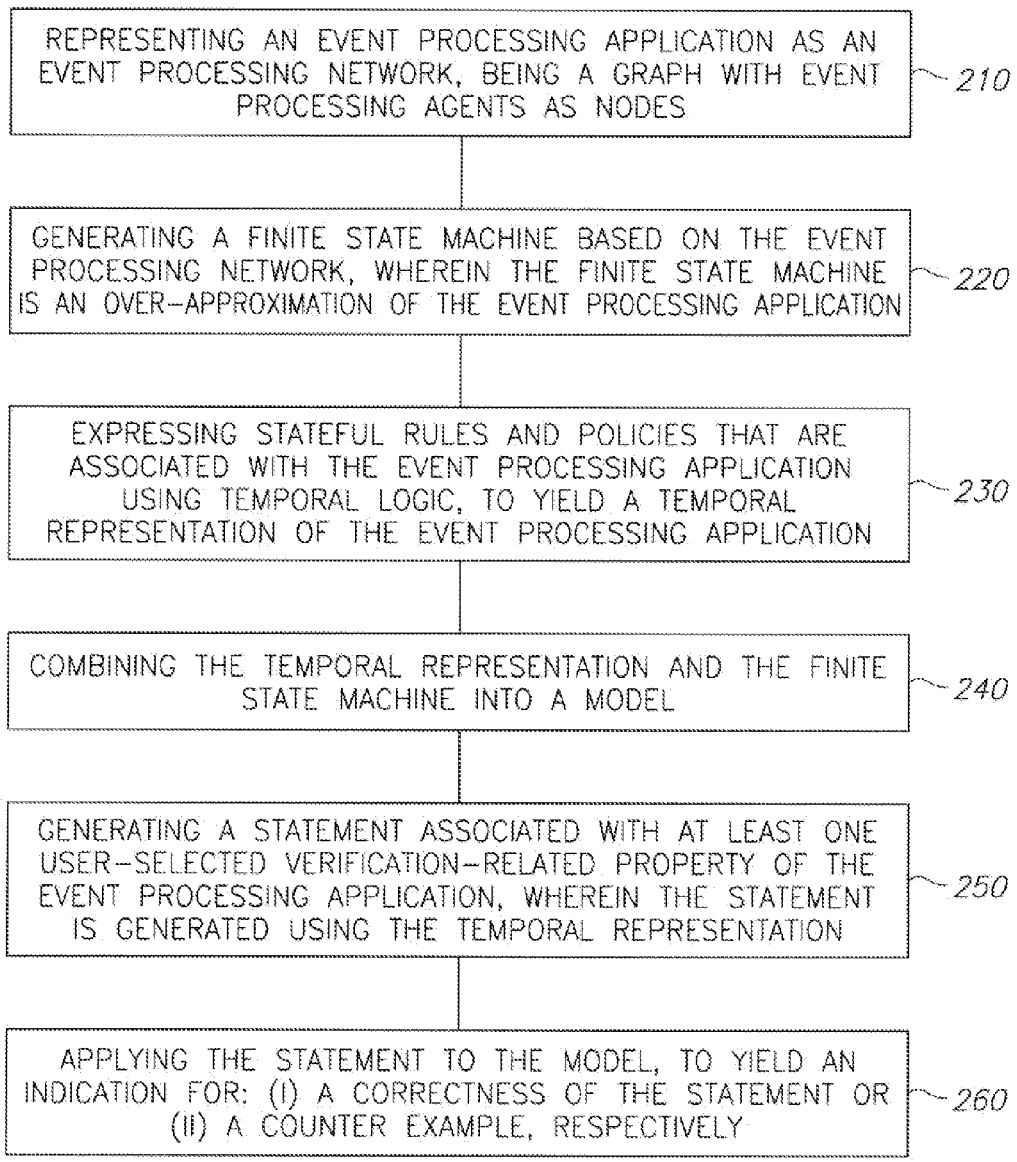
FIG. 2 is a high level flowchart illustrating a method according to some embodiments of the invention.

FIG. 2 is a high level flowchart illustrating a method according to some embodiments of the invention. Method 200 may start with a stage of representing an event processing application as an event processing network, being a graph with event processing agents as nodes 210. The method then goes on to the stage of generating a finite state machine based on the event processing network, wherein the finite state machine is an over-approximation of the event processing application 220. The method then goes on to the stage of expressing, possibly by a user, stateful rules and policies that are associated with the event processing application using temporal logic, to yield a temporal representation of the event processing application 230. Then the model is generated by combining the temporal representation and the finite state machine into a model 240. Then, possibly responsive to a user, the method proceeds to a stage of generating a statement associated with a user-selected verification-related property of the event processing application, wherein the statement is generated using the temporal representation 250. Finally, the method goes on to a stage of applying the statement to the model, to yield an indication for: (i) a correctness of the statement or (ii) a counter example, respectively 260. It is noted that method 200 may be implemented using a variety of architectures and is not necessarily limited by the aforementioned architecture of system 100.

The remainder of the description illustrates several non-limiting implementations of embodiments of the present invention. Consistent with some embodiments of the present invention, the representation of the event processing application may be carried out by a model that comprises a set of variables together with conditions that define the values of the variables at initial cycles and how those values change from one cycle to another.

Formally, the model is a discrete transition system (DS), a symbolic representation of a finite automaton on finite or infinite words. The definition is derived from the definition of a fair discrete system (FDS). Following is a formal representation. A DS D: <V, init, next> consists of the following components:

V={v1, . . . , vn}: A finite set of typed state-variables over possibly infinite domains. A DS-state defines the valuations of each of the state-variables. For example, V={a, b,c} is a set of three variables. The tuple s=(0,1,0) defines the state in which a and c have the value 0, and b has the value 1, i.e. s[a]=s[c]=0, s[b]=1;

init: The initialization function. This is a function assigning an initial value to each variable. For example, for the set V above we define: init(b):=0 init(c):=0; meaning that the initial states of the system are all the states in which b=0 and c=0 and a can have any value in its domain; and next: This is a set of functions next(vi)=Ni(V) assigning the next cycle value to each of the variables, based on their values in the current cycle. For example, next(a)=a and next(b)=c defines that the value of a does not change from the current DS-state to the next DS-state and that the value of b in the next DS-state is the same as the value of c in the current cycle.

In order to describe an event processing application, a model is built containing just the events that the event processing application gets as an input. The set of variables V includes a Boolean variable ve for each event type ET. ve=1 in a certain cycle means the event e∈ET occurred in that cycle. Since events can arrive at any cycle, the variable gets either the value 0 or 1 at each cycle. This is done by setting init (ve):={0,1} and next(ve):={0,1} where init and next are as defined above. For example, in case an event E is associated with attribute a, an integer variable E_a that gets a random integer value each cycle may be defined. Further, an auxiliary integer variable E_a_aux may be defined so that it is initially random and changes to E_a at a cycle E occurs and stays constant between two occurrences of E.

According to some embodiments of the present invention, the application logic may be represented by Property Specification Language (PSL) sequences that express scenarios over time on a given model. A PSL sequence describes a constraint on the scenario. For example the sequence {req; busy; ack} holds only on scenarios in which the event req happens in the first cycle, the event busy happens in the second cycle and the event ack happens in the third cycle. It I noted that an event can happen or not in a cycle that does not refer to it in the sequence. For example, req can either happen or not in the second and third cycle. The mentioned sequence does not constrain the cycles after the third cycle.

Following are some implementations using PSL used herein as a mere non-limiting example. It should be noted that the statements can be generated using other languages. In the following notation, the PSL operator [*] represents a repetition of zero or more cycle. For example the sequence {req; busy[*]; ack} represents scenarios in which the event req occurs in the first cycle, which is followed by zero or more cycles in which busy occurs, followed by a cycle in which ack occurs.

The function ended is used to detect the end of sequence. For a sequence s, ended(s) is true exactly when the last cycle of s is detected. Logical not and logical and are represented by the operators ! and & respectively. For example for events e1 and e2, the Boolean expression !e1 means e1 does not occur at the current cycle, e1 & e2 means e1 and e2 occur at the current cycle.

In order to model the logic of the event processing application, PSL sequences are defined, such that the assertions and derivation logic of the event processing application are expressed by the sequence. The event processing application is then defined by a Boolean variable that is true exactly when the end of the sequence is reached. The following sections present examples of this methodology.

Regarding reachability, it may be possible to derive from the counter example via a compiler, an execution path along the event processing network, demonstrating the failure of the statement. It may be possible to present the execution path as a scenario for testing reachability of any of the event processing agents on the network.

Following is an exemplary statement that may be applied to the model:

E1, E2, E3, E4—event types, each with attributes {a,b,c}.
A1: All(E1,E2), s.t. E1.a>E2.b, output event is E3 (E3.a:=E1.a and E3.b:=E2.b)
A2: Sequence(E3,E4), s.t. E3.a=E3.b and E4.c>10

Wherein A1 and A2 are event processing agents residing on the same network, wherein All(E1,E2) states for pattern looking for both E1 and E2 arrived in any relative order between them, and Sequence(E3,E4) states for pattern looking for E3 and E4 arrived in this order, and E3 event can only be derived by A1

According to the logic above, A2 will never be detected, due to the combination of the All pattern condition, and derivation expression of E3: E3.a, E3.b attributes are derived from E1.a and E2.b respectively, and they will never be equal, as required, due to the E1.a>E2.b condition in the All pattern. Therefore A2 pattern should be observed as unreachable.

It is further assumed that every event instance overrides its predecessor (a previous instance of the same type). Also, for the sake of clarity, it is assumed that the processing above is done within a single time window, between "start" and "end" events. Below is the procedure for proving this observation using model checking.

E1, E2, and E4 are defined to be random Boolean variables, and the attributes of E1: E1.a and E1.b are further defined to be random integers (e1_a and e1_b respectively). e1_a and e1_b are defined to hold the E1.a, E1.b attributes respectively of the last E1 event for each scenario that matches the sequence (using the next and init functions).

Additionally, A1 may be defined as the following PSL sequence:

sequence A1:=
{{start; !end[*]; e1&!end; !end[*]} &&
{start; !end[*]; e2&!end; !end[*]}:
{e1_a>e1_b & (e1|e2)}};

Where the sequence {start; !end[*]; e1&!end; !end} is matched by any scenario that starts with start and is followed by an arbitrary number of cycles in which end does not occur (represented by !end[*]) and e1 occurs at least once.

Similarly the sequence {start; !end[*]; e2&!end; !end}, is matched by any scenario that starts with start and is followed by an arbitrary number of cycles in which end does not occur and e2 occurs at least once. The && operator forces the sequences (1) and (2) to occur in parallel. That is, the sequence:

{{start; !end[*]; e1&!end; !end[*]}&&
{start; !end[*]; e2&!end; !end[*]}} is matched by all the sequences that start with start, followed by an arbitrary number of cycles in which end does not happen, during which both e1 and e2 occur at least once, in any order.

Finally, the condition {e1_a>e1_b & (e1|e2)}} means that e1_a>e1_b, and either e1 or e2 should occur in the last cycle. To summarize: the sequence A1 is matched only by a sequence of cycles as above where in the last cycle either E1 or E2 occurred and E1.a is greater than E1.b for the last E1 occurrence.

E3 is defined to hold exactly when the end of A1 is detected, that is, E3 is true at each cycle in which an e1 or e2 event occurs ant for the last pair of e1, e2 events, e1.a>e1.b. There can be many such pairs and for each such pair E3 will be true in the corresponding cycle. E3 is defined to be :=ended (A1).

Whenever E3 occurs E3_a, E3_b get the E1.a, E1.b attributes respectively of the E1 event, for which the end of the A1 sequence is detected. The following is defined as the sequence for A2:

sequence A2:={start; !end[*]; !end &E3 & (E3_a=E3_b); !end[*]; !end & E4 &E4_c>10; !end[*]};

The sequence A2 is matched by any scenario that starts with start, followed by an arbitrary number of cycles in which end does not occur during which there is at least one occurrence of E3 where E3.a=E3.b, followed by an E4 event in which E4.c>10.

Finally, it is possible to instruct the model checker to check whether EPA2 is never detected. The following formula passes if and only if EPA2 is never detected: never{EPA2}!

For the above formula, the model checker reported "passed vacuously" meaning EPA2 is not reachable. Moreover, the model checker gave an explanation indicating that a cycle in which E3.a=E3.b after start is not reachable.

In addition to unreachability proofs, a model checker may be configured to verify equivalence and mutual exclusion of event processing. Event processing agents Ai and Aj may be regarded, under some definition, as logically equivalent in accordance with the following:

Ai is logically equivalent to Aj if for each cycle t,
Ai is detected at cycle t ↔ Aj is detected at cycle t,
$0 \leq i, j \leq M-1$, $i \neq j$.

Wherein Ai and Aj are event processing agents residing on a common event processing network. It should be noted however, that the aforementioned definition is not necessarily the only definition for logic equivalence and it is used herein for illustrative purposes only.

Regarding the property of logic equivalence, in order to show that event processing agents A1 and A2 are equivalent, sequences are defined for A1 and A2 and Boolean variables A1_detected and A2_detected that are true exactly at the cycles in which the end of the A1 sequence and A2 sequences, respectively, are detected. The model checker is then instructed to check that in every cycle, the value of A1_detected equals the value of A2_detected. This property is expressed in PSL by: always (A1_detected<->A2_detected).

Regarding the property of mutual exclusivity, mutual exclusion of two event processing agents may be defined as follows:

Ai and Aj are mutually exclusive if for each cycle t,
Ai is detected at cycle t→Aj is not detected at cycle t and
Aj is detected at cycle t→Ai is not detected at cycle t,
$0 \leq i, j \leq M-1$, $i \neq j$ Wherein Ai and Aj are event processing agents residing on a common event processing network. It should be noted however, that the aforementioned definition is not necessarily the only definition for mutual exclusivity and it is used herein for illustrative purposes only.

In order to check the mutual exclusion of A1 and A2, the model checker will verify the following formula that checks that A1_detected and A2_detected never occur simultaneously: never (A1_detected & A2_detected)

It should be noted that both observations (equivalence and mutual exclusion) may be valuable for validation of event processing application logic. The former may point out a redundancy in application logic, and the latter may indicate a possible contradiction of event processing agents.

Regarding generating a scenario for complete or partial application coverage, i.e., a scenario in which every event processing agent is fired and every event type arrives (or is derived), is a reasonable requirement during application development. Moreover, it is often essential for application maintenance, (e.g. running regression tests).

The aforementioned technique for proving reachability of an event processing agent can be applied for generating testing scenarios for the coverage of a set of event processing agents. Given an event processing network for a set of event processing agents, it is possible to generate a spanning tree of the graph (e.g., by Depth First Search) and check reachability for each leaf of the spanning tree. Once the model checker produces a trace showing the reachability of a given event processing agent, this trace can be used to produce a testing scenario for the event processing tool, verifying that each derived event going to consumer, can actually be fired.

Figure 3:
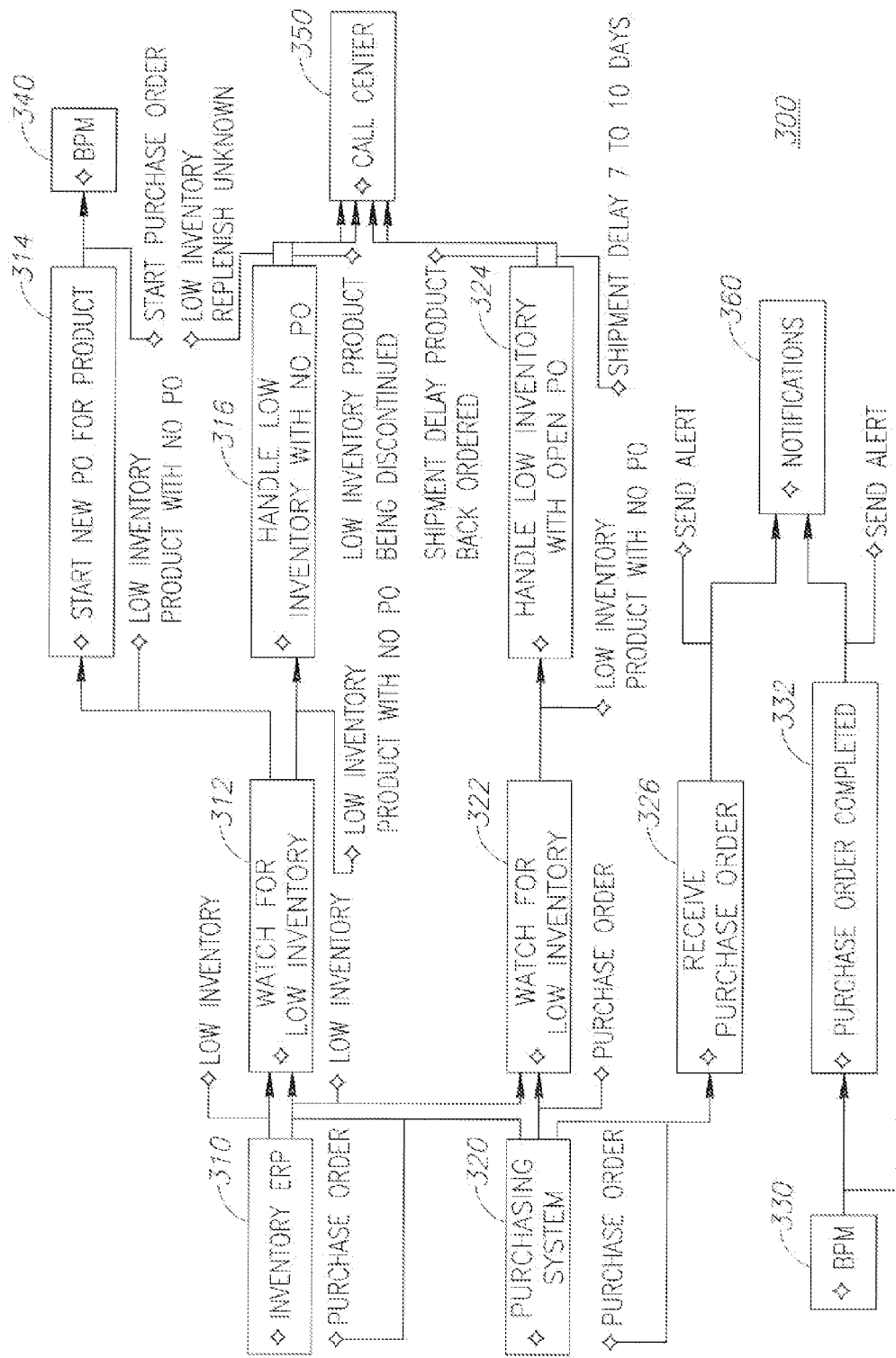
FIG. 3 is an exemplary graph diagram illustrating several aspects according to some embodiments of the invention.

FIG. 3 is graph 300 showing an exemplary real-life event processing network that may include: producers 310, 320, and 330; event processing agents 312, 314, 316, 322, 324, 326, and 332; and consumers 340, 350, and 360. Graph 300 illustrates coverage test achieved through formal verification methods. In graph 300, the leaves are the nodes that do not have outgoing edges to event processing agent nodes. For each such leaf, a PSL sequence is defined and an execution path for the corresponding event processing agent detection is produced. For the event processing network represented by graph 300, a PSL sequence for each one of the leaves is created: "Start New PO for Product" 314, "Handle Low Inventory with No PO" 326, and "Handle Low Inventory with Open PO" 324.

As described above, each such a sequence expresses the entire logic of a corresponding event processing agent. Therefore, in order to manifest a statement regarding an event processing agent reachability, the model checker is queried whether the end of the respective PSL sequence is never detected. If the formula passes, then the corresponding event processing agent is unreachable and no scenario for its detection exists. If the formula fails, then the model checker will produce a counter-example that can be used to generate a scenario. As mentioned above, the event processing testing case is generated by a "compilation" of the model checker counter-example trace back to an event processing application scenario. Finally, by combining all leaves' counter-examples and translating them back to event instances, we obtain a scenario which ensures that all the derived events that are going to consumers are fired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments"

means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
   representing an event processing application as an event processing network, being a graph with event processing agents as nodes;
   generating a finite state machine based on the event processing network, wherein the finite state machine is an over-approximation of the event processing application;
   expressing stateful rules and policies that are associated with the event processing application using temporal logic, to yield a temporal representation of the event processing application;
   combining the temporal representation and the finite state machine into a model;
   generating a statement associated with at least one user-selected verification-related property of the event processing application, wherein the statement is generated using the temporal representation; and
   applying the statement to the model, to yield an indication for: (i) a correctness of the statement or (ii) a counter example, respectively, wherein at least one of: the representing, the expressing, the combining the generating, and the applying is carried out by at least one processor,
   wherein the at least one verification-related property of the event processing application is a mutual exclusivity of two of the event processing agents within the graph, and wherein the statement indicates that the two or more of the event processing agents are mutual exclusive such that for any given input, one of the two event processing agents produces a different output from another one of the two event processing agents, at a same point of time, and wherein the counter example is compilable into a sequence of events that contradicts the statement.

2. The method according to claim 1, wherein the user-selected verification-related property is expressible as a property represented by the event processing network and comprises at least one of: reachability of at least one of the event processing agents, equivalence of two or more of the event processing agents; mutual exclusivity of two or more of the event processing agents; and coverage of at least some of the event processing agents.

3. The method according to claim 1, wherein the modeling is carried out using a language capable of describing a transition system and wherein the expressing is carried out using a language capable of expressing a sequential behavior of the finite state machine.

4. The method according to claim 1, wherein the counter example is compilable into a sequence of events, that when applied to the event processing application, triggers the event processing agents that are associated with the verification-related property.

5. The method according to claim 1, wherein the at least one verification-related property of the event processing application is reachability of a specified event processing agent within the event processing network, and wherein the statement indicates that the specified event processing agent is unreachable over the graph, and wherein the respective counter example is compilable into a sequence of events that traces a path over the event processing network to the specified event processing agent.

6. The method according to claim 1, wherein the at least one verification-related property of the event processing application is an equivalence of two or more of the event processing agents within the event processing network, and wherein the statement indicates that the two or more of the event processing agents produce a same output for a same input at a same period of time, and wherein the counter example is compilable into a sequence of events that contradicts the statement.

7. The method according to claim 1, wherein the at least one verification-related property of the event processing application is a coverage of one or more paths of event processing agents over the event processing network, wherein the statement indicates that at least one of the event processing agents on the one or more paths is not reachable, and wherein the counter example is compilable into at least one sequence of events that covers all of the event processing agents that are on the one or more paths.

8. A system comprising:
- a graph builder configured to represent an event processing application as an event processing network, being a graph with event processing agents as nodes;
- a finite state machine generator configured to generate a finite state machine, based on the event processing network, wherein the finite state machine is an over-approximation of the event processing application;
- a logic expresser configured to express stateful rules and policies that are associated with the event processing application using temporal logic, to yield a temporal representation of the event processing application;
- a combiner configured to combine the temporal representation and the finite state machine into a model;
- a statement generator configured to generate a statement associated with at least one user-selected verification-related property of the event processing application, wherein the statement is generated using the temporal representation; and
- a model checker configured to apply the statement to the model, to yield an indication for: (i) a correctness of the statement or (ii) a counter example, respectively, wherein the graph builder, the finite state machine generator, the logic expresser, the statement generator, and the model checker are in operative associated with at least one processor,
- wherein the at least one verification-related property of the event processing application is a mutual exclusivity of two of the event processing agents within the graph, and wherein the statement indicates that the two or more of the event processing agents are mutual exclusive such that for any given input, one of the two event processing agents produces a different output from another one of the two event processing agents, at a same point of time, and wherein the counter example is compilable into a sequence of events that contradicts the statement.

9. The system according to claim 8, further comprising a compiler configured to receive the counter example and produce a corresponding sequence of events.

10. The system according to claim 8, wherein the user-selected verification-related property is expressible as a property represented by the event processing network and comprises at least one of: a reachability of at least one of the event processing agents; an equivalence of two or more of the event processing agents; a mutual exclusivity of two or more of the event processing agents; and a coverage of at least some of the event processing agents.

11. The system according to claim 8, wherein the finite state machine is expressed using a language capable of describing a transition system and wherein the temporal representation is carried out using a language capable of expressing a sequential behavior of the finite state machine.

12. The system according to claim 8, wherein the counter example is compilable into a sequence of events, that when applied to the event processing application, triggers the event processing agents that are associated with the verification-related property.

13. The system according to claim 8, wherein the at least one verification-related property of the event processing application is reachability of a specified event processing agent within the event processing network, and wherein the statement indicates that the specified event processing agent is unreachable over the graph, and wherein the respective counter example is compilable into a sequence of events that traces a path over the event processing network to the specified event processing agent.

14. The system according to claim 8, wherein the at least one verification-related property of the event processing application is an equivalence of two or more of the event processing agents within the event processing network, and wherein the statement indicates that the two or more of the event processing agents produce a same output for a same input at a same period of time, and wherein the counter example is compilable into a sequence of events that contradicts the statement.

15. The system according to claim 8, wherein the at least one verification-related property of the event processing application is a coverage of one or more paths of event processing agents over the event processing network, wherein the statement indicates that at least one of the event processing agents on the one or more paths are not reachable, and wherein the counter example is compilable into at least one sequence of events that covers all of the event processing agents that are on the one or more paths.

16. A computer program product for applying formal verification methodology to an event processing application, the computer program product comprising:
- a non-transitory computer readable storage medium having computer readable program embodied therewith, the computer readable program comprising:
  - computer readable program configured to represent an event processing application as an event processing network, being a graph with event processing agents as nodes;
  - computer readable program configured to generate a finite state machine, based on the event processing network, wherein the finite state machine is an over-approximation of the event processing application;
  - computer readable program configured to express stateful rules and policies that are associated with the event processing application using temporal logic, to yield a temporal representation of the event processing application;
  - computer readable program configured to combine the temporal representation and the finite state machine into a model;
  - computer readable program configured to generate a statement associated with at least one user-selected verification-related property of the event processing application, wherein the statement is generated using the temporal representation; and
  - computer readable program configured to apply the statement to the model, to yield an indication for: (i) a correctness of the statement or (ii) a counter example, respectively,
- wherein the at least one verification-related property of the event processing application is a mutual exclusivity of two of the event processing agents within the graph, and wherein the statement indicates that the two or more of the event processing agents are mutual exclusive such that for any given input, one of the two event processing agents produces a different output from another one of the two event processing agents, at a same point of time, and wherein the counter example is compilable into a sequence of events that contradicts the statement.

17. The computer program product according to claim 16, wherein the user-selected verification-related property is expressible as a property represented by the event processing network and comprises at least one of: reachability of at least one of the event processing agents; equivalence of two or more of the event processing agents; mutual exclusivity of two or more of the event processing agents; and coverage of at least some of the event processing agents.

18. The computer program product according to claim 16, wherein the modeling is carried out using a language capable of describing a transition system, and wherein the expressing is carried out using a language capable of expressing a sequential behavior of the finite state machine.

19. The computer program product according to claim 16, wherein the counter example is compilable into a sequence of events, that when applied to the event processing application, triggers the event processing agents that are associated with the verification-related property.

20. The computer program product according to claim 16, wherein the at least one verification-related property of the event processing application is reachability of a specified event processing agent within the event processing network, and wherein the statement indicates that the specified event processing agent is unreachable over the graph, and wherein the respective counter example is compilable into a sequence of events that traces a path over the event processing network to the specified event processing agent.

21. The computer program product according to claim 16, wherein the at least one verification-related property of the event processing application is an equivalence of two or more of the event processing agents within the event processing network, and wherein the statement indicates that the two or more of the event processing agents produce a same output for a same input at a same period of time, and wherein the counter example is compilable into a sequence of events that contradicts the statement.

22. The computer program product according to claim 16, wherein the at least one verification-related property of the event processing application is a coverage of one or more paths of event processing agents over the event processing network, wherein the statement indicates that at least one of the event processing agents on the one or more paths are not reachable, and wherein the counter example is compilable into at least one sequence of events that covers all of the event processing agents that are on the one or more paths.

\* \* \* \* \*